United States Patent Office 3,405,328
Patented Oct. 8, 1968

3,405,328
INCANDESCENT LAMP WITH A REFRACTORY METAL CARBIDE FILAMENT
Herman A. Johansen, Monroeville, and James G. Cleary, Pittsburgh, Pa., assignors to Westinghouse Electric Corporation, Pittsburgh, Pa., a corporation of Pennsylvania
Filed Mar. 2, 1966, Ser. No. 531,134
4 Claims. (Cl. 317—222)

ABSTRACT OF THE DISCLOSURE

The invention provides a refractory metal carbide filament, in a lamp, with a major percentage of tantalum carbide. The filament has a reservoir of carbon dispersed through it for replacing any carbon lost when carbide escapes from the filament.

---

This invention relates generally to an incandescent lamp having a metal carbide refractory incandescible member and the method of manufacturing the member and, more particularly, to a lamp having a tantalum carbide incandescible member which exhibits thermal stability and good mechanical strength at high temperatures.

Present day tungsten incandescent filament lamps are inexpensive and long lived; however, the brightness at which such tungsten filaments can be operated is limited by the melting point of tungsten.

Heretofore, tantalum carbide has been proposed as a substitute for tungsten as an incandescent lamp material because of its high melting point (about 4100° K.). To date, tantalum carbide has not been used commercially, primarily because of the brittleness of the filament and the difficulties in forming same.

Tantalum carbide decarburizes readily forming a subcarbide having a lower melting point which contributes to lamp failure. Attempts to overcome this have been directed at providing a protective atmosphere—particularly hydrocarbons, hydrogen, and/or organic halides to help regenerate the filament losses. One difficulty with such a protective atmosphere is the presence of hydrogen originally placed in the bulb, or liberated from the hydrocarbon by thermal cracking on the hot filament. The high thermal conductivity of the hydrogen causes excessive power losses.

Most previous efforts to provide a tantalum carbide filament were based on mounting a tantalum or tantalum-alloy wire in the bulb and carbiding the wire with a suitable hydrocarbon atmosphere. It is extremely difficult to accomplish full carbonization by this method. Also excess carbon or a carbon reservoir cannot be formed, in these prior art filaments, to provide replacement carbon to the metal carbide, as the filament is decarbonized due to the high operating temperatures of the lamp. In addition, the carbiding method of the prior art offers only limited control of the composition and carbon content of the filament.

It is therefore an object of this invention to provide a tantalum carbide refractory member having improved thermal stability.

It is a further object of this invention to provide a tantalum carbide refractory member which is substantially fully carbonized and which has good mechanical strength.

It is another object of this invention to provide a tantalum carbide filament which has improved strength and brightness, and which can be operated for a relatively long time at a higher temperature.

It is an additional object of this invention to provide a tantalum carbide refractory member which has a reservoir of excess carbon.

It is still a further object of this invention to provide a tantalum carbide refractory member which exhibits improved operation in an inert gas atmosphere.

It is still another object of this invention to provide a method of manufacturing a tantalum carbide refractory member in which the carbon content and metal composition of the refractory member can be readily varied.

Briefly, these and other objects are achieved by providing a lamp having an incandescible refractory member substantially comprising refractory metal carbide and a reservoir of carbon dispersed therethrough. The metal carbide comprises at least a major percentage of tantalum carbide. As the carbon in the metal carbide escapes from the surface of the incandescible member, the carbon in the carbon reservoir diffuses through the metal carbide lattice and replaces the lost carbon. The total carbon in the incandescible member may vary from about 2 to about 26 gram-atom percent more than that amount of carbon required to form stoichiometric refractory metal carbide with the refractory metal in the incandescible member. The method for manufacturing a refractory or incandescible member for such a lamp requires a mixture of finely divided particles containing the components of the refractory member plus a suitable binder material. The mixture may be either in the form of refractory metal carbide plus binder, or refractory metal carbide plus carbon binder, or refractory metal plus carbon plus binder, or refractory metal plus carbon plus refractory metal carbide plus binder. The total carbon content of the mixture may vary from about 73 to about 126 gram-atom percent of the amount of carbon required to form stoichiometric refractory metal carbide with the refractory metal, combined and/or uncombined, in the mixture. The binder in the mixture is used in amounts of from about 2 to about 10 percent by weight of the mixture, and is at least one metal of the group consisting of iron, cobalt, nickel, and manganese. The temperature of the mixture is raised, under nonreactive conditions, to at least the melting point of the binder while a predetermined pressure is simultaneously applied to the mixture. The temperature and pressure-compaction are maintained until the density of the mixture approaches the theoretical density value. The temperature of the mixture is then lowered to below the melting point of the binder. The binder is then substantially removed from the resulting refractory member.

For a better understanding of this invention, reference should be made to the accompanying detailed description and drawing, in which.

Figure 1:
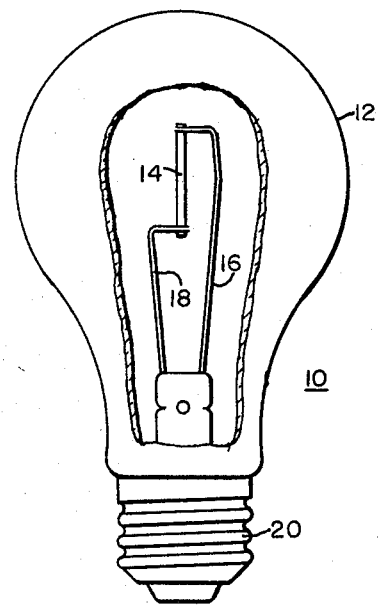
FIGURE 1 is a perspective view, partly broken away, of a lamp employing the present refractory member or filament.

Referring to FIG. 1, there is shown a lamp 10 which is operable at a high brightness. The lamp 10 has a sealed envelope 12 which is at least partially light transmitting and which is preferably made of glass. An incandescible member or filament 14 is mounted on lead-in supports 16 and 18 within the envelope 12. The lead-in supports 16 and 18 are connected to the filament 14 and are conventionally sealed through the envelope and connect to a base 20. The inside of the envelope 12 permits sustained operation of the lamp 10 without adversely affecting the filament 14. As an example, the atmosphere is any noble gas or any mixture thereof although it may comprise hydrogen, carbon and halogen as normally used with a tantalum carbide filament.

The filament 14 preferably is fully carbonized and preferably is provided with a carbon reservoir by means of the present method, as described hereinafter. The carbon reservoir increases the life and permissible operating temperature of filament 14. A high operating temperature is desirable because of the resulting increased brightness. The carbon reservoir operates to replace carbon which has volatilized from the metal carbide. The filament 14 has improved thermal stability because it remains substantially fully carbonized as long as the carbon reservoir is not exhausted. Because of this reservoir, the provision of carbon in the lamp atmosphere is not required, although it may be used, if desired. Heretofore, a carbon-containing atmosphere was employed to regenerate the filament 14 and suppress carbon losses.

The filament 14 comprises at least a major percentage of tantalum carbide. Minor percentages of additional carbides of at least one metal of the group consisting of zirconium, hafnium, tungsten, molybdenum, titanium, uranium, vanadium, thorium, and niobium may be added as desired. The total carbides of all the metals in this group should not exceed 30 percent by weight. The total carbides of the metals molybdenum, titanium, uranium, vanadium, thorium and niobium should not exceed 10 percent by weight of the filament 14.

As a specific example, a 90% by weight tantalum carbide, 10% by weight tungsten carbide filament 14 is employed. The filament is approximately 2″ long and has a cross section of approximately $6.25 \times 10^{-4}$ square inches. The filament is adapted to be energized by about 10 volts, 60 cycle AC to a temperature of about 3400° K., and such a filament can be so energized for more than 70 hours before failure. The initial carbon content of the filament is only slightly greater than that amount of carbon required to form stoichiometric metal carbide with the metal in the filament 14. Longer life times were noted for filaments having a higher initial carbon content. The volume enclosed by the envelope 12 is 500 cc., and it is filled with argon at a pressure of about one atmosphere at room temperature.

Figure 2:
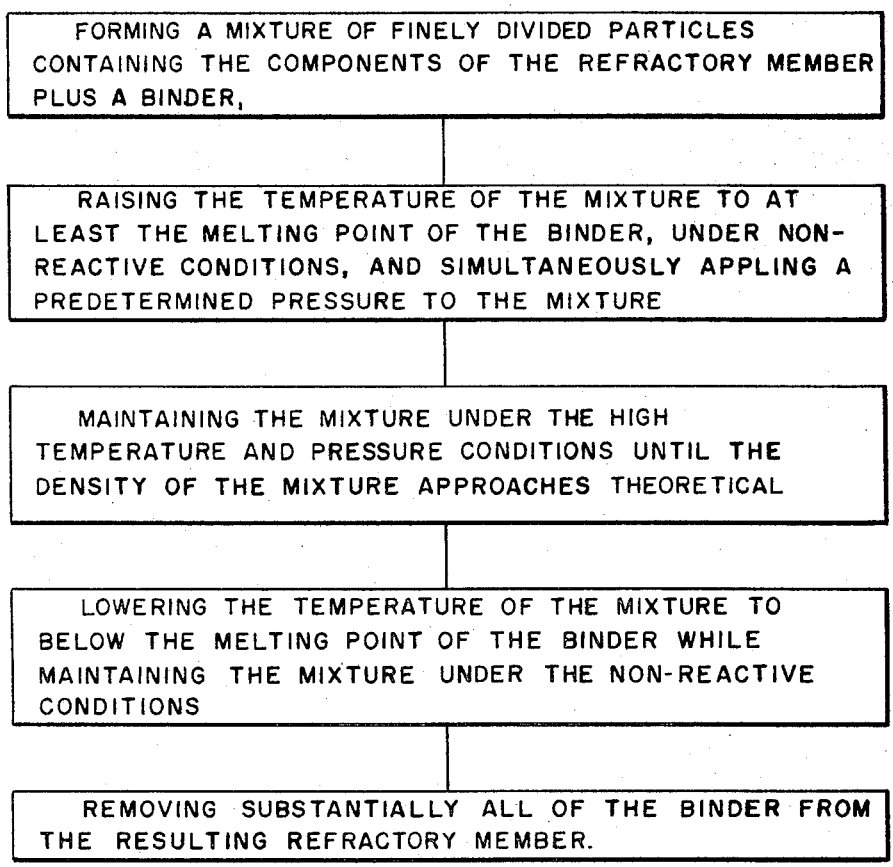
FIG. 2 is a flow diagram of the basic steps of the method of manufacturing the present refractory member.

Referring to FIG. 2, there is shown a flow diagram illustrating the method of manufacturing a refractory member or filament 14. The first step involves forming a mixture of finely divided particles containing the components of the filament 14 plus a binder material. The binder is used as an aid in forming a coherent refractory member from the particles in the mixture, and the binder is removed later. The mixture of particles may comprise either refractory metal carbide plus binder, or refractory metal carbide plus carbon plus binder, or refractory metal plus carbon plus binder, or refractory metal carbide plus refractory metal plus carbon plus binder. The total carbon content in the mixture may be varied from about 73 to about 126 gram-atom percent of that amount of carbon required to react stoichiometrically with the total refractory metal in the mixture. When the carbon content is varied beyond these ranges, the resulting filament will have a shortened life time due to mechanical weakening. The preferred range of carbon content is from about 80 to about 120 gram-atom percent. The binder is present in from about 2 percent by weight to about 10 percent by weight of the mixture. The amount of binder present may affect the density of the refractory member to be formed. The preferred range of binder is from about 3 to about 5 percent by weight. The binder is at least one metal of the group consisting of iron, cobalt, nickel, and manganese.

Figure 3:
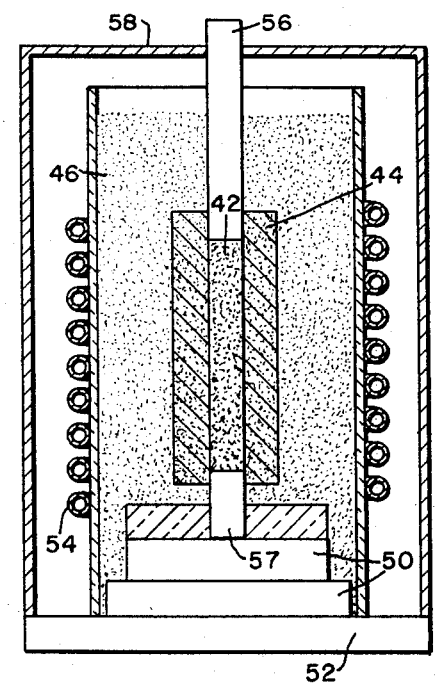
FIG. 3 is a sectional view showing the heating-processing apparatus used in carrying out the present method.

Referring now to FIG. 3, there is shown a heating-pressing apparatus 40 for achieving the heating and pressing steps of the method. The mixture 42 of finely divided particles is held in a die 44, preferably made of graphite. The die 44 is surrounded by an insulating material 46 such as powdered zirconium oxide. The insulating material 46 and die 44 are contained in an outer shell 48 preferably made of quartz. The die 44 and shell 48 are supported on insulating blocks 50 which are preferably made of zirconium oxide. The blocks 50 are in turn supported by base 52. Induction heating coils 54 are provided around the outside of the shell 48 for heating the mixture 42. Die plungers 56 and 57 are provided extending into the die 44 for applying pressure on the mixture 42 during heating. The heating-pressing apparatus 40 is mounted in a container 58 filled with any one of the noble gases or any mixture thereof.

Referring again to FIG. 2, the next step of the method is to raise the temperature of the mixture 42 to at least the melting point of the binder. The melting points of iron, cobalt, nickel and manganese, are respectively 1535, 1495, 1455 and 1260° C. The formation of a unitary member occurs faster at higher temperatures. The maximum temperature that can be employed in this heating step is primarily a matter of equipment limitations, although it preferably should not exceed about 2800° C. The heating is performed in the presence of the noble gas, preferably argon, because of the reactive properties of the mixture 42 at the temperature involved.

The next step of the method is to maintain the temperature established in the heating step under nonreactive conditions, while a pressure of at least about 250 p.s.i. is applied to the mixture 42. The maximum pressure applied to the mixture 42 was 2000 p.s.i. due to apparatus limitations. Higher pressures may be employed with other equipment. The length of time that the pressure is applied depends on the temperature and pressure involved with the lower the temperature and pressure, the longer the time. As an example, a suitable time is about 20 minutes at a temperature of 1800° C., and a pressure of 1000 p.s.i. A time of about 10 minutes may be used at a temperature of 2200° C. and a pressure of 250 p.s.i. As a practical matter at very high temperatures and pressures, the pressure-compaction and heating is maintained for at least one minute. The resulting member has a density which approaches the theoretical density of the material. Good results are obtained when the pressure is about 250 p.s.i. and the temperature is about 1800° C., with the pressure-heating time maintained for at least ten minutes. It is preferred, however, to use a pressure of at least about 1000 p.s.i. with a temperature of at least about 1800° C., maintained for at least about twenty minutes.

After heating and pressing, the temperature of the dense member is lowered to below the melting point of the binder.

After formation of the dense member, the binder is removed. This is readily accomplished by heating the refractory member in a vacuum which causes the binder to volatilize out of the refractory member. The time required for this step is dependent on the size of the refractory member and the temperature used. The minimum practical temperature for this step is about 1800° C. As an example, the removal of the binder is accomplished by heating for one hour at a temperature of 2000° C. and under a pressure of $10^{-3}$ torr.

When using the foregoing method, the composition of the refractory member may be controlled readily. The desired constituents are simply mixed together in the desired proportions to form the mixture 42. The carbon content of the refractory member may be varied throughout the ranges described hereinbefore. Various refractory metal carbide mixtures may be formed, as discussed hereinbefore. The binder content may also be varied simply by adding more or less binder material to the mixture 42. The binder content of the mixture 42 has a pronounced effect on how closely the density of the resulting refractory member approaches theoretical density. The highest density is achieved when the binder concentration is about 4 percent by weight of the mixture. This highest density obtained was about 95 percent of the theoretical density. As a specific example of this method, a mixture of 90 percent by weight tantalum carbide particles and 10 percent by weight tungsten carbide particles is formed.

Excess carbon is added in amount of 26 gram-atom percent of the carbon in the metal carbides. A finely divided cobalt binder is added in amount of 4 percent by weight of the mixture. The mixture is then placed in a graphite die having a round cavity about one centimeter in diameter and about twelve centimeters long. The mixture is then heated to about 2200° C. in an argon atmosphere under a pressure of about 2000 p.s.i. for at least 10 minutes. The binder is then removed as described hereinbefore. The resulting refractory member is then cut to the desired size filament and mounted in a lamp.

As an alternative embodiment, the refractory metal can be added as finely divided metal along with finely divided carbon, or as a mixture of finely divided metal carbide and finely divided metal along with finely divided carbon. Preferably the finely divided particles comprising the mixture have a diameter less than about fifty microns.

Any of the other indicated binder materials, or a mixture thereof, can be substituted for all or a part of the foregoing cobalt binder material, maintaining the relative proportions of the binder materials within the indicated ranges. Also, the finely divided tantalum carbide can be used alone, or in combination with any of the other indicated refractory metal carbides, within the indicated ranges.

It will be apparent to those skilled in the art that the objects of this invention have been achieved by providing a tantalum carbide refractory member which has a carbon reservoir. As carbon continuously volatilizes from the refractory member during operation, the carbon in the reservoir maintains the metal carbide in a substantially fully carbonized state. This increases the permissible operating temperature. The lifetime of the lamp is also increased. The fully carbonized condition of the member or filament provides desirable mechanical strength properties. The supply of carbon in the reservoir within the filament permits sustained operation of the filament in inert atmospheres. The method of manufacturing the filament allows easy control of the filament composition. It is a simple matter to add the desired proportions of ingredients to the mixture of particles.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

What is claimed is:

1. In combination with a lamp which is operable with a high brightness and comprising, a light transmitting sealed envelope which is at least partially light transmitting, an incandescible member supported within said envelope, electrical lead-in means sealed through said envelope and electrically connected to said incandescible member, and an atmosphere contained within said envelope which will permit sustained operation of said incandescible member, the improved incandescible member which comprises: an incandescible body member substantially comprising refractory metal carbide with carbon dispersed therethrough, said refractory metal carbide comprising at least a major percentage of tantalum carbide, and the total carbon in said incandescible member present in amount of from about 2 to about 26 gram-atom percent more than that amount of carbon which will form stoichiometric refractory metal carbide with the total refractory metal in said incandescible member.

2. The combination as specified in claim 1, wherein said refractory metal carbide comprises a major percentage of tantalum carbide plus a minor percentage of additional metal carbide formed by at least one metal of the group consisting of zirconium, hafnium, tungsten, molybdenum, titanium, uranium, vanadium, thorium and niobium, the total metal carbides of said group present in amount up to 30 percent by weight of the total refractory metal carbide in said member, and the total metal carbide of the meals molybdenum, titanium, uranium, vanadium, thorium and niobium not exceeding 10 percent by weight of the total refractory metal carbide in said member.

3. The combination as specified in claim 1, wherein said refractory metal carbide is 90 percent by weight tantalum carbide and 10 percent by weight tungsten carbide.

4. The combination as specified in claim 1, wherein said atmosphere is any noble gas or any mixture of noble gases.

References Cited
UNITED STATES PATENTS

| | | | |
|---|---|---|---|
| 1,154,514 | 9/1915 | Jacoby | 313—222 |
| 1,311,133 | 7/1919 | Mott | 313—311 |
| 3,022,438 | 2/1962 | Cooper | 313—222 |

JAMES D. KALLAM, *Primary Examiner.*